United States Patent [19]
Torii et al.

[11] Patent Number: 5,140,129
[45] Date of Patent: Aug. 18, 1992

[54] MULTI-ARTICULATED ARM TYPE INDUSTRIAL LASER ROBOT

[75] Inventors: Nobutoshi Torii, Hachioji; Susumu Ito; Akihiro Terada, both of Yamanashi, all of Japan

[73] Assignee: Fanuc Ltd., Yamanashi, Japan

[21] Appl. No.: 668,498

[22] PCT Filed: Apr. 17, 1990

[86] PCT No.: PCT/JP90/00920
§ 371 Date: Mar. 18, 1991
§ 102(e) Date: Mar. 18, 1991

[87] PCT Pub. No.: WO91/01194
PCT Pub. Date: Feb. 7, 1991

[30] Foreign Application Priority Data
Jul. 20, 1989 [JP] Japan .................. 1-186018

[51] Int. Cl.$^5$ .............................. B23K 26/08
[52] U.S. Cl. .................................. 219/121.78
[58] Field of Search ............. 219/121.78, 121.79

[56] References Cited
U.S. PATENT DOCUMENTS

| 4,539,462 | 9/1985 | Plankenhorn | 219/121.69 |
| 4,563,567 | 1/1986 | Geffroy et al. | 219/121.68 |
| 4,694,139 | 9/1987 | Röder | 219/121.68 |

FOREIGN PATENT DOCUMENTS
61-269993 11/1986 Japan .
2131388 6/1984 United Kingdom ........... 219/121.78
2153785 8/1985 United Kingdom ........... 219/121.78

*Primary Examiner*—C. L. Albritton
*Attorney, Agent, or Firm*—Armstrong, Nikaido, Marmelstein, Kubovcik & Murray

[57] ABSTRACT

A laser beam passage (10) arranged outside a robot unit of a multi-articulated arm type industrial laser robot has a base (71), a swivel body (72), a first robot arm (74) supported for swing motion, a second robot arm (76) pivotally joined to the first robot arm (74), and a robot wrist (80) attached to an front end of the second robot arm (76) and provided with a laser beam emitting head (79) to connect a laser oscillator (12) to a laser beam receiving unit (77) provided on a rear end of the second robot arm (76). The laser beam passage means (10) has a first laser beam shifting system (20) routing a laser beam emitted by the laser oscillator (12) to an extremity thereof, and having a plurality of rotary joints ($R_1$, $R_2$), one telescopic linear-motion joint ($S_1$), a plurality of laser beam conduits (24, 26) and built-in laser beam reflecting mirrors (25, 27); and a second laser beam shifting system (30) routing the laser beam from the extremity of the first laser beam shifting system (20) toward the laser beam receiving unit (77) attached to the rear end of the second robot arm (76), and having a plurality of rotary joints ($R_4$ to $R_6$), a plurality of laser beam conduits (32, 35, 37) and built-in laser beam reflecting mirrors (34, 36).

4 Claims, 3 Drawing Sheets

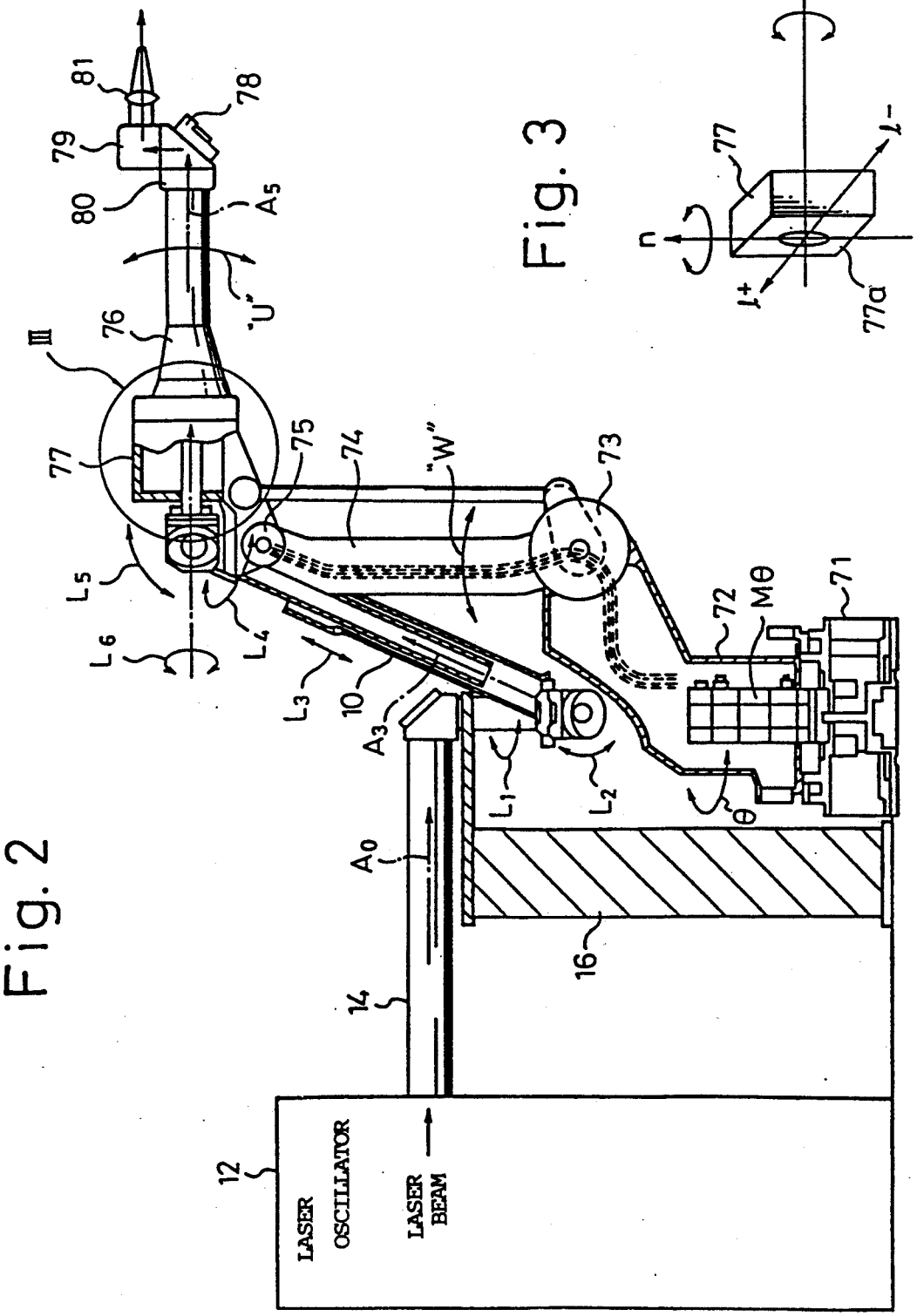

MULTI-ARTICULATED ARM TYPE INDUSTRIAL LASER ROBOT

TECHNICAL FIELD

The present invention relates to a multi-articulated arm type industrial robot intended for application to industrial welding, cutting and surface-treatment of workpieces, such as metallic plates, by an emission of a laser beam introduced from a laser beam source.

RELATED ART

Various types of multi-articulated arm type industrial laser robots have been proposed and applied to practical purposes. The applicant of the present patent application has proposed, in International Patent Application No. PCT/JP90/00104, an improvement in such a conventional industrial laser robot, wherein a laser beam can be maintained at a high energy level. FIG. 4 shows an example of such an improved industrial laser robot. As shown in FIG. 4, the improved industrial robot is a multi-articulated arm type industrial laser robot provided with at least two articulated robot arms 44 and 46 (an upper arm 44 capable of implementing a W-axis swing motion, and a lower arm 46 capable of implementing a U-axis swing motion, referred to herein as "a first robot arm" and "a second robot arm", respectively) held directly or through a swivel body 42 on a robot base 41, a robot wrist 48 held on the extremity of the articulated first robot arm 44 and the second robot arm 46 to emit a laser beam, and a laser beam passage means 50 which includes a hollow ball-spline shaft 54 having one end connected to the joint of the first robot arm 44 and the second robot arm 46 the laser beam passae means further includes, ball-spline nut combined with the ball-spline shaft 54, capable of stretching and contracting in response to the swing motions of the first and the second robot arms 44 and 46 relative to each other. The laser beam passage means 50 extends outside the arms 44 and is 46, and capable of guiding a laser beam guided thereto by a laser beam conduit 62 from outside the robot unit to the robot wrist by using the least necessary number of built-in laser beam reflecting mirrors.

This improved multi-articulated industrial laser robot, however, has the problem in some cases of, the energy of the laser beam not being effectively used, because the laser beam passage means 50 is connected to the joints of the robot unit by optical passage connectors 58 and 60. The mode of swing motion of the laser beam passage means 50 following the motions of the first robot arm 44 and the second robot arm 46 is conducted by the help of rotary arm joint mechanisms incorporated in the joints. It is possible that when the laser beam reaches the robot wrist 48, the laser beam is emitted along a passage at an angle to a predetermined passage due to the deflection of the axes of passages (optical axes) of the laser beam and the dislocation of the laser beam from the centers of the reflecting mirrors of the optical passage connector 58 caused by the rotational runout, tilt and dislocation of the joints attributable to various causes, including assembly errors remaining in the joints and an insufficient accuracy of rotary bearings incorporated into the joints. The laser beam is reflected by the laser beam reflecting mirrors based on the relationship between the angle of incidence and the angle of reflection. That is, although the laser beam emitting head of the robot wrist 48, in general, is provided with a condenser lens or the like, the laser beam may be unable to strike the condenser lens at a correct angle of incidence and at a correct position on the condenser lens due to the deflection or dislocation of the optical passages caused by the components for directing the laser beam to the condenser lens being such-that the condenser lens is unable to condense the laser beam to a spot having a predetermined diameter. Consequently, the energy of the spot of the laser beam on the workpiece cannot be increased to a level necessary for welding, cutting or surface treatment, such as burring, thereby adversely affecting the laser beam machining accuracy

DISCLOSURE OF THE INVENTION

Accordingly, an object of the present invention is to provide an industrial laser robot provided with a laser beam passage means capable of further improving the laser beam machining accuracy of the industrial laser robot.

Another object of the present invention is to provide a multi-articulated arm type industrial laser robot provided with a laser beam passage means having a construction capable of guiding a laser beam through the exterior of the robot unit instead of through the interior of the construction of the robot arm system, and of guiding the laser beam with an improved guiding accuracy.

The present invention provides a multi-articulated arm type industrial laser robot including: two articulated robot arms, namely, first and second robot arms; a robot wrist for emitting a laser beam, held on an extremity of the articulated robot arms; and a laser beam passage means for routing a laser beam emitted by a laser beam source through an exterior of a robot unit of the laser robot and one end of the second robot arm toward the robot wrist for emitting the laser beam. The laser beam passage means incorporates a plurality of rotary joints having a plurality of axes of rotation perpendicular to each other and a telescopic linear-motion joint, provided on a side of the laser beam source; a first laser beam reflecting system internally provided with laser beam reflecting mirrors; a plurality of rotary joints having a plurality of axes of rotation perpendicular to each other and provided near an extremity of the second robot arm; and a second laser beam reflecting system internally provided with laser beam reflecting mirrors and arranged to route the laser beam traveled through the first laser beam reflecting system toward the extremity of the first robot arm. Built as separate units separated from the robot arm system, the first and second laser beam reflecting systems can be fabricated and assembled to a desired optical accuracy, and are able to follow robot motions during an operation of the multi-articulated arm type industrial laser robot without being affected by errors in the movable components including the robot arms. Thus, the laser beam is accurately routed toward the laser beam emitting head of the robot wrist.

BRIEF DESCRIPTION OF THE DRAWINGS

The above and other objects, features and advantages of the present invention will become more apparent from the following description taken in connection with the accompanying drawings, in which:

FIG. 2 is a front view, in part cross-section, of a multi-articulated industrial laser robot incorporating the laser beam passage means in accordance with the present invention;

FIG. 3 is an explanatory illustration of assistance in explaining the function of a portion indicated at III in FIG. 2, and;

BEST MODE OF CARRYING OUT THE INVENTION

Figure 1:
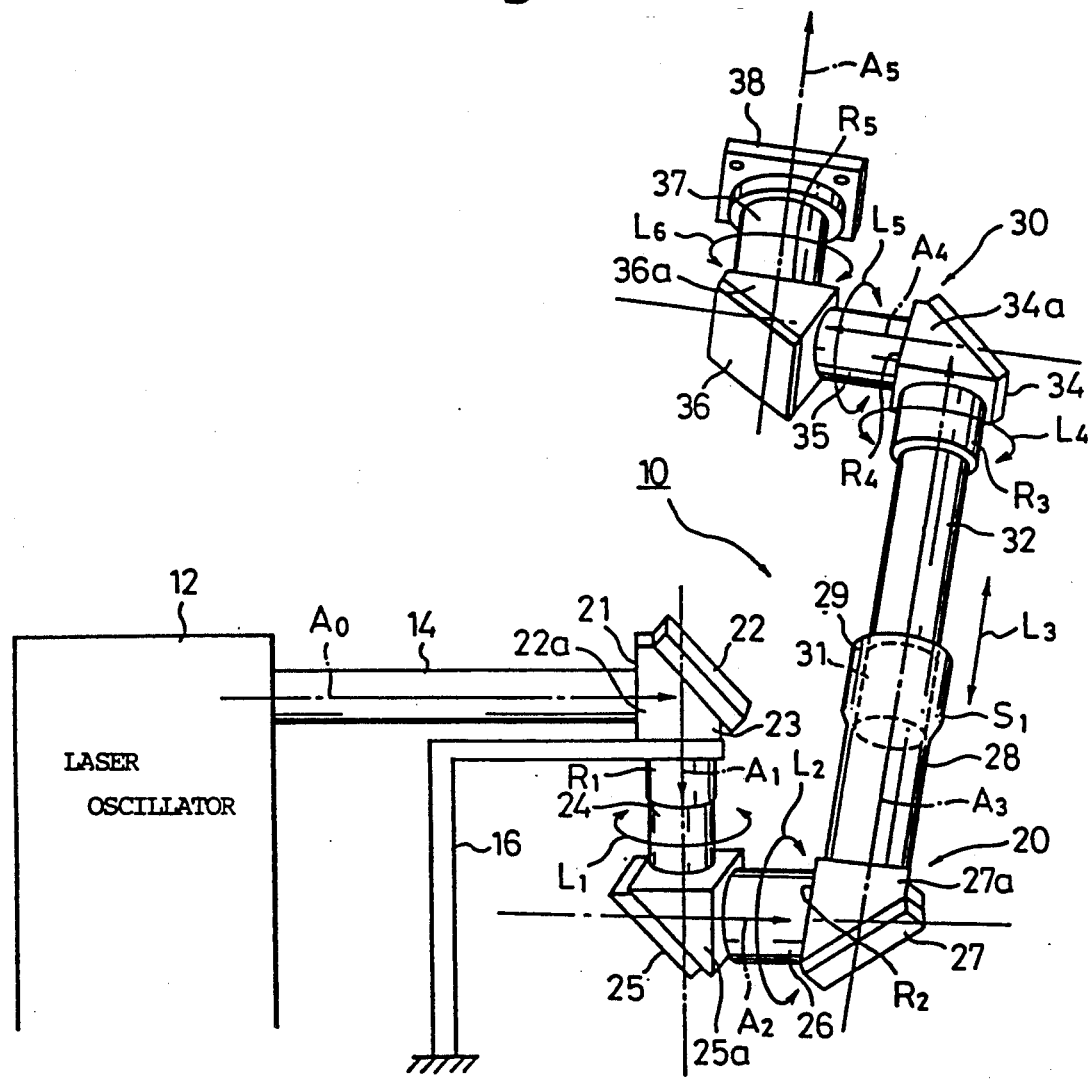
FIG. 1 is a perspective view of a laser beam passage means to be incorporated into a multi-articulated arm type industrial laser robot in accordance with an embodiment of the present invention.
Figure 4:
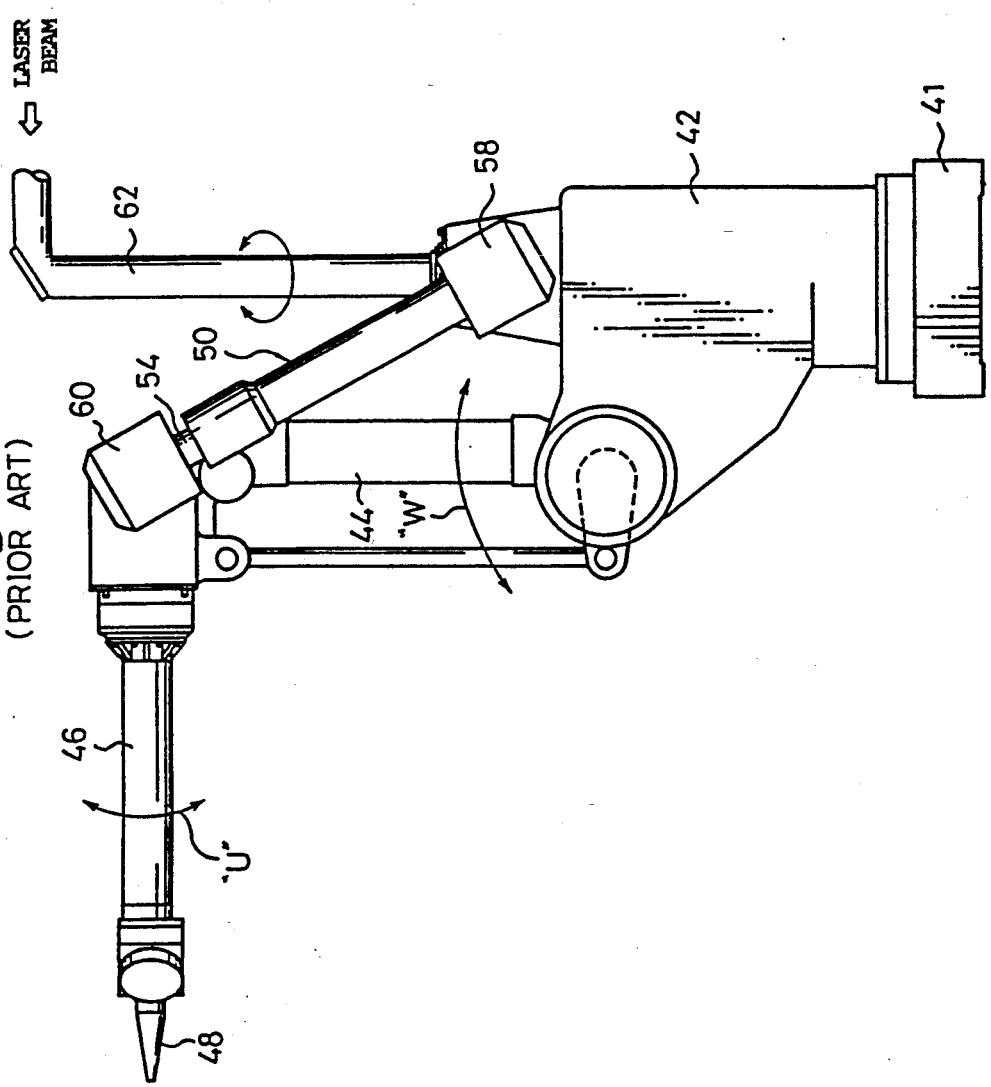
FIG. 4 is a front view illustrating a part of the construction of a conventional multi-articulated arm type industrial laser robot.

Referring first to FIG. 1, a laser beam passage means 10 embodying the present invention is intended for use on an industrial laser robot provided with a swivel body, a robot upper arm capable of implementing a W-axis swing motion, a robot forearm capable of implementing a U-axis swing motion, and a robot wrist having a laser beam emitting head and held on the extremity of the robot forearm. The laser beam passage means 10 is a movable structure which includes a first laser beam passage shifting system 20 and a second laser beam passage shifting system 30. The first laser beam passage shifting system 20 includes a laser beam receiving unit 21 for receiving a laser beam emitted by a laser oscillator 12 (i.e., a laser beam source) along a beam passage $A_0$ in a laser beam conduit 14, a mirror holder 22a holding a laser beam reflecting mirror 22 for shifting the laser beam in a desired direction, and a stationary cylindrical conduit unit 23 having a beam passage $A_1$ therein and extending downward from the mirror holder 22a. The mirror holder 22a is fixedly held on a support frame 16 fixedly installed on a fixed surface, such as the surface of the floor. A rotary cylindrical conduit 24 is joined to the lower end of the cylindrical conduit 23 for rotational motion $L_1$ by a rotary joint $R_1$ comprised of a bearing means such as an anti-friction type roller bearing or a rotary slide bearing. The laser beam travels along the beam passage $A_1$ through the rotary cylindrical conduit 24 and is reflected by a laser beam reflecting mirror 25 held by a mirror holder 25a at the lower end of the rotary cylindrical conduit 24 so as to travel along a beam passage $A_2$ through a rotary cylindrical conduit 26 and onto a reflecting mirror 27 held by a mirror holder 27a at a point of incidence on the reflecting mirror 27.

The rotary cylindrical conduit 26 and the mirror holder 27a are capable of implementing a rotational motion $L_2$ relative to the mirror holder 25a. The mirror holder 25a or the mirror holder 27a is internally provided with a rotary joint $R_2$. The first laser beam passage shifting system 20 further includes a cylindrical conduit 28 through which the laser beam traveling along the laser beam passage $A_2$ is and reflected by the reflecting mirror 27 so as to travel along a laser beam passage $A_3$. One component 29 of the components of a precision linear motion guide means $S_1$, for example, a well-known precision linear motion guide means having a ball-spline nut or a slide ball bearing, is accommodated in the free end of the cylindrical conduit 28.

The base end of the second laser beam passage shifting system 30 is joined for an accurate linear motion $L_3$ relative to the cylindrical conduit 28 to the extremity of the cylindrical conduit 28 by the component 29 of the linear motion guide means. A cylindrical conduit 32 is provided, in one end thereof, with the other component 31 of the linear motion guide means. Thus, the laser beam reflected by the reflecting mirror 27 travels along a beam passage $A_3$ through the cylindrical conduit 32 and a rotary joint 33, and falls on a reflecting mirror 34 held by a reflecting mirror holder 34a. The laser beam is then reflected by the reflecting mirror 34 to travel along a beam passage $A_4$. A rotary joint $R_3$ joins the reflecting mirror holder 34a for a rotational motion $L_4$ relative to the circular conduit 32 to the extremity of the cylindrical conduit 32. The rotary joint $R_3$ internally provided with a precision rotary bearing enables the rotational motion $L_4$. The laser beam reflected by the reflecting mirror 34 travels along a beam passage $A_4$ formed through a rotary cylindrical conduit 35. The cylindrical conduit 35 has one end joined to the reflecting mirror holder 34a and the other end joined to a reflecting mirror holder 36a. A rotary joint $R_4$ having a rotary bearing therein is accommodated in either the reflecting mirror holder 34a or 36a, for example, in the reflecting mirror holder 34a, to permit the reflecting mirror holders 34a and 36a to rotate relative to one another for a rotational motion $L_5$. A reflecting mirror 36 held by the reflecting mirror holder 36a reflects the laser beam traveled along the beam passage $A_4$, to make the beam travel along a beam passage $A_5$ through a cylindrical conduit 37. The cylindrical conduit 37 is capable of rotating relative to the reflecting mirror holder 36a. That is, the reflecting mirror holder 36a is internally provided with a rotary joint $R_5$ having a rotary bearing therein to enable the cylindrical conduit 37 to carry out a rotational motion $L_6$. The rotary cylindrical conduit 37 is provided, at an extremity thereof, with an end flange 38 to be attached to the robot unit.

From the foregoing description, it will be understood that the laser beam passage means 10 in the above-mentioned embodiment has the first laser beam shifting system 20 and the second laser beam shifting system 30, and is constructed beforehand in a separate structural unit independent from the robot unit. The laser passage means 10 per se is a six-degree-of-freedom structural unit capable of implementing the rotational and linear motions $L_1$ through $L_6$. Namely, the construction of the laser beam passage means 10 having a plurality of degrees of freedom of motion enables the rotary joints for the rotational motions and the linear sliding joint comprising the linear guide mechanism for the linear motion to be fabricated and assembled beforehand, so that the optical passages are manufactured at a desired high accuracy. Accordingly, the laser beam passage means 10 constructed in a separate structural unit having multiple degrees of freedom of motion can be accommodated in the multi-articulated arm type industrial laser robot to arrange the laser beam passages outside the robot unit without extending the same through the joints of the robot unit in such a manner that the final beam passage is connected to an entrance of the laser beam emitting head arranged at the extremity of the robot unit.

FIG. 2 shows a combination of the laser beam passage means 10 of FIG. 1 and the robot unit of a multi-articulated arm type industrial laser robot, in which components, units and functions corresponding to those shown in FIG. 1 are denoted by the same reference numerals and characters.

Referring to FIG. 2, the robot unit of the multi-articulated arm type industrial robot includes a base 71, a swivel body 72 mounted on the base 71 and driven by a drive motor MΘ for a swivel motion about a vertical Θ-axis, a first robot arm 74 pivotally joined by a rotary joint 73 to an offset end of the swivel body for swing motion in s vertical plane about a horizontal W-axis, a second robot arm 76 pivotally joined by a rotary joint 75 to the upper end of the first robot arm 74, a laser beam receiving unit 77 provided on the rear end of the second robot arm 76, and a robot wrist 80 having a reflecting mirror 78 therein and a laser beam emitting head 79, and attached to the front end of the second robot arm 76. The laser beam emitting head 79 is internally provided with a condenser lens 81 to emit a condensed laser beam through the condenser lens 81 to use an energy of the laser beam for laser beam machining.

The end flange 38 provided at the extremity of the second laser beam shifting system 30 of the laser beam passage mean 10 is attached to the laser beam receiving unit 77 of the robot body. Thus, the laser beam emitted by the laser oscillator 12, i.e., the laser beam source, travels through the laser beam passage means 10 having the optical passages arranged outside the robot unit and enters the laser beam receiving unit 77, which is disposed at the front extremity of the arrangement of a robot movable unit including the swivel body 72 and the robot arms 74 and 76. The laser beam received by the laser beam receiving unit 77 is simply reflected by the reflecting mirror 78 so as to travel toward the laser beam emitting head 79 along the beam passage A₅. The laser beam is shifted by the laser beam emitting head 79 to travel toward the condenser lens 81. Accordingly, the laser beam guiding function of the laser beam passage means 10 is not affected by the motions of the robot unit on the rotary joints. Moreover, the laser beam passage means 10 having a plurality of degrees of freedom of linear and rotational motions $L_1$ through $L_6$ is capable of being freely moved to follow the robot motions of the robot movable unit of the robot unit on the joints. Accordingly, an accuracy of the beam passages $A_1$ to $A_5$ along which the laser beam travels depends only on an accuracy of the laser beam passage means 10, but any adverse affect of assembling errors of the joints of the robot unit as well as that of the accuracy of the rotary bearings on the functional accuracy of the beam passages $A_1$ through $A_5$ can be avoided.

Referring now to FIG. 3 which is a conceptional illustration of a portion III of the laser beam receiving unit 77, the end flange 38 of the laser beam passage means 10 is fastened to a surface 77a of the laser beam receiving unit 77.

Assuming that the laser beam passage mean 10 is attached to the robot unit in such a manner that the optical axis $A_1$ of the first laser beam shifting system 20 of the means 10 is in alignment with the vertical Θ-axis of the swivel body 72 of the robot unit as shown in FIG. 2, then the robot arms 74 and 76 of the robot unit and the surface 77a of the laser beam receiving unit 77 swing about horizontal axes, i.e., about the W-axis and the U-axis, respectively. Accordingly, when the end flange 38 of the laser beam passage means 10 is attached to the surface 77a of the laser beam receiving unit 77, and if the surface 77a should be linearly dislocated in a direction indicated by +1 or −1 (FIG. 3) and/or deflected in a direction "n" and/or a direction "m" (FIG. 3), the linear dislocation and deflection of the surface 77a can be absorbed by the movement of the laser beam passage means 10, and accordingly, the laser beam is able to travel along the optical passage A₅ and correctly strike the reflecting mirror 78 regardless of the position and orientation of the surface 77a, and the laser beam reflected by the reflecting mirror 78 is able to be condensed without errors by the condenser lens 81 of the laser beam emitting head 79.

From the foregoing, it will be understood that the laser beam passage means in accordance with the present invention has the laser beam passages arranged outside the robot unit of an industrial robot, and is connected to the laser beam receiving unit of the robot unit in such a manner that the motions of the joints of the motion mechanism of the robot unit do not adversely affect the accuracy of the laser beam passages along which the laser beam travels, and the laser beam receiving unit is constructed so as not to be affected by the joints of the robot unit. Therefore, the laser beam passages are able to route the laser beam from the laser beam source to the condenser lens of the laser beam emitting head at a high accuracy, if the laser beam passage means is accurately fabricated and assembled beforehand. Thus, the laser beam can travel along the beam passage in alignment with that optical axis of the condenser lens, and is able to correctly strike the center of the condenser lens. The laser beam condensed by the condenser lens is therefore emitted on an objective portion of the workpiece without entailing an energy loss due to the dislocation and variation in the diameter of the spot of the laser beam. Namely, the present invention can ensure that the laser beam machining is always maintained at a high accuracy.

LIST OF REFERENCE CHARACTERS

10 Laser beam passage means
12 Laser
14 Laser beam conduit
16 Support frame
20 First laser beam shifting system
22 Laser beam reflecting mirror
22a Mirror holder
23 Stationary circular conduit
24 Rotary circular conduit
25 Laser beam reflecting mirror
25a Mirror holder
26 Rotary circular conduit
27 Reflecting mirror
27a Mirror holder
28 Circular conduit
29 Component
30 Second laser beam shifting system
31 Component
32 Circular conduit
34 Reflecting mirror
35 Rotary circular conduit
36 Reflecting mirror
36a Reflecting mirror holder
37 Circular conduit
38 End flange
41 Robot base
42 Swivel body
44 Robot arm
46 Robot arm
48 Robot wrist
50 Laser beam passage means
54 Hollow ball-spline shaft
58 Optical passage connector
60 Optical passage connector
62 Laser beam conduit
71 Base
72 Swivel body 73 Rotary joint
74 First robot arm
75 Rotary joint
76 Second robot arm
77 Laser beam receiving unit
78 Reflecting mirror
79 Laser beam projecting head
80 Robot wrist
81 Condenser lens

We claim:

1. In a multi-articulated arm type industrial laser robot including mutually articulated first and second robot arms, a robot wrist for emitting a laser beam, held on a front extremity of the articulated first and second robot arms, and a laser beam passage means for routing a laser beam emitted from a laser beam source through laser beam passages arranged outside a robot unit of the laser robot to the robot wrist for emitting the laser beam, said laser beam passage means comprising:

a first laser means shifting system operatively connected to the laser beam source, including two rotary joints provided with a plurality of axes of rotation perpendicular to each other, a linear-motion joint for telescopic linear motion, a plurality of laser beam conduit means for forming a path of the laser beam as the laser beam is being routed, and internally arranged laser beam reflecting mirrors, said first laser beam shifting system being capable of routing said laser beam emitted by said laser beam source toward an out-ut end thereof; and a second laser beam shifting system operatively connected to he front extremity of the second robot arm and to the output end of said first laser beam shifting system, said second laser beam shifting system including three rotary joints having a plurality of axes of rotation perpendicular to each other, a plurality of laser beam conduit means for forming a path of the laser beam as the laser beam is being routed, internally arranged laser beam reflecting mirrors, and an engaging portion engaged with said telescopic linear-motion joint, said second laser beam shifting system being capable of routing said laser beam from the output end of said first laser beam shifting system toward an output end of said second robot arm whereby said laser beam passage means is provided with six degrees of freedom of motion.

2. A multi-articulated arm type industrial laser robot according to claim 1, wherein said second laser beam shifting system further includes an end flange to be joined to one end of said second robot arm.

3. A multi-articulated arm type industrial laser robot according to claim 1, wherein said laser beam passage means is provided with five laser beam conduit means.

4. A multi-articulated arm type industrial laser robot according to claim 1, wherein said telescopic linear-motion joint of said first laser beam shifting system of said laser beam passage means includes a linear motion guide means.

* * * * *